Jan. 9, 1951  E. E. EVENSON  2,537,449
RING
Filed July 6, 1948
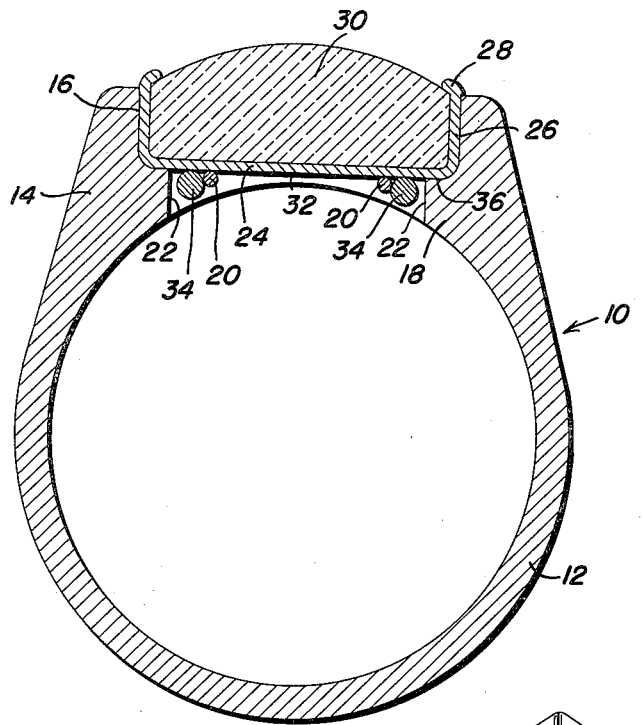
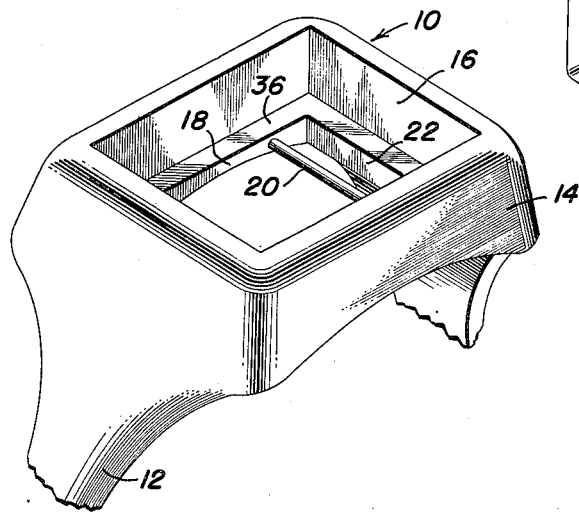
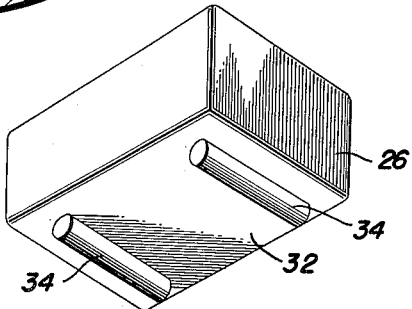
Emil E. Evenson
INVENTOR.
BY *Clarence A. O'Brien*
*and Harvey B. Jacobson*
Attorneys Patented Jan. 9, 1951

2,537,449

UNITED STATES PATENT OFFICE 2,537,449

RING

Emil E. Evenson, New Effington, S. Dak.

Application July 6, 1948, Serial No. 37,188

2 Claims. (Cl. 63—15)

This invention relates to new and useful improvements in finger rings and the primary object of the present invention is to provide a finger ring in which the box or base on the shank of the ring is provided with a recess and embodying novel and improved means for releasably securing a cage holding stone in the said recess.

Another important object of the present invention is to provide a detachable ornamental setting for rings including a jewel supporting cage engageable in a recess provided in the box of the ring, a plurality of bearing members carried by the box of the ring and supporting the cage, and novel and improved friction means carried by the cage and engaging the bearing members to releasably secure the cage in the box.

A further object of the present invention is to provide a ring having a detachable stone mounting that is extremely neat and attractive in appearance and so designed as to facilitate the jewel supporting cage thereof to be quickly and readily removed or replaced for the insertion of various types of jewels, stones, images, indicia or the like.

A still further aim of the present invention is to provide a ring of the aforementioned character that is simple and practical in construction, strong and reliable in use, small and compact in structure, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view of the ring constructed in accordance with the present invention;

Figure 2 is a fragmentary perspective view of the present ring, and showing the stone supporting cage removed therefrom; and Figure 3 is a perspective view of the stone or jewel supporting cage, and illustrating the means carried thereby for frictionally locking the same into the box or socket portion of the ring.

Referring now to the drawings in detail, wherein for the purpose of illustration, there is disclosed a preferred embodiment of the present invention; the numeral 10 represents the present ring generally, including a shank 12 and an integral box, base or socket 14 that is preferably rectangular in shape.

The base 14 is provided with a substantially rectangular recess 16 in its outer face and communicates with a peripheral or rectangular shoulder 18 that is disposed in the said recess 16.

Rigidly secured within the recess or socket 16 is a pair of spaced parallel, preferably cylindrical bearing members or bars 20 that are spaced from the end faces 22 of the shoulder 18. The numeral 24 represents a substantially rectangular box or cage having a peripheral flange 26 the outer extremities of which are turned inwardly to provide bearing surfaces or portions 28 that will engage the outer surface of a stone, jewel or the like 30 that is positioned within the said cage. Rigidly secured by welding or the like to the lower or inner bearing face 32 of the cage 24, is a pair of spaced parallel cylindrical bearing members or rods 34.

In practical use of the present invention, the cage 24 is inserted into the recess 16 so that the flange portion 26 will bear against the inner walls of the recess 16, the inner face 32 of the cage 24 will bear upon the outer bearing surface 36 and the inner face 32 of the cage 24 will also bear upon the outer periphery of surface of the bearing members 20 to support the said cage within the recess 16. As the said cage is forced into position, the bearing members 34 will bear against the bearing members 20 to frictionally retain the said cage disposed in the recess 16. It should be noted, that the bearing members 20 are disposed and held between the bearing members 34, as shown best in Figure 1 of the drawings.

In order to remove the cage 24 from the recess 16, a user merely extends his finger or a suitable tool through an opening provided in the inner face of the box 14 and presses outwardly upon the cage thus disengaging the bearing members 34 from the bearing members 20. In this manner, the cage 24 may be replaced by a similar cage supporting a different type of jewel, image or stone.

Obviously, the bearing members 20 are of a diameter less than the bearing members 34, so as to assure a positive locking and friction locking engagement of the bearing members 34 with the bearing members 20. Also, the bearing members 20 will be somewhat resilient in their characteristics so that when the cage is forced into place the same will properly hold the bearing members 34, however, these rods 20 will return to their normally spaced parallel position when the cage is removed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a ring having a base portion and a shank portion, said base portion having a substantially rectangular recess therein, a peripheral shoulder fixed in said recess, and a cage received in said recess and bearing upon said shoulder means for retaining the cage in the recess comprising a pair of first and second spaced parallel cylindrical bars fixed in said recess, and a pair of first and second spaced parallel rods carried by said cage, said bars being disposed between and parallel to said rods, said first rod yieldingly engaging said first bar and being spaced from said second bar and said second rod yieldingly engaging said second bar and being spaced from said first bar.

2. Means for releasably securing a setting to a base, said means comprising first and second spaced parallel bars, and first and second spaced parallel rods, said rods being parallel to and disposed between said bars, said first rod yieldingly engaging said first bar and said second rod yieldingly engaging said second bar.

EMIL E. EVENSON.

REFERENCES CITED

The following references are of record in the file of this patent:

UNITED STATES PATENTS

| Number | Name | Date |
| --- | --- | --- |
| 467,928 | Fink | Feb. 2, 1892 |
| 470,751 | Fink | Mar. 15, 1892 |
| 480,080 | Fink | Aug. 2, 1892 |
| 732,245 | Weiss | June 30, 1903 |
| 1,052,141 | Gaschke | Feb. 4, 1913 |